(12) United States Patent
Skoff et al.

(10) Patent No.: US 6,400,135 B1
(45) Date of Patent: Jun. 4, 2002

(54) MOUNTING FOR A WHEEL-SPEED SENSOR

(75) Inventors: Gerhard Skoff, Vienna; Alfred Strasser, Wiesen, both of (AT)

(73) Assignee: Steyr-Daimler-Puch Aktiengesellschaft, Vienna (AT)

( * ) Notice: Subject to any disclaimer, the term of this patent is extended or adjusted under 35 U.S.C. 154(b) by 0 days.

(21) Appl. No.: 09/402,736

(22) PCT Filed: Mar. 24, 1998

(86) PCT No.: PCT/AT98/00077

§ 371 (c)(1),
(2), (4) Date: Oct. 8, 1999

(87) PCT Pub. No.: WO98/43097

PCT Pub. Date: Oct. 1, 1998

(30) Foreign Application Priority Data

Mar. 26, 1997 (AT) .......................................... 180/97 U

(51) Int. Cl.$^7$ ................................................. G01P 3/44
(52) U.S. Cl. ................................... 324/173; 324/207.25
(58) Field of Search ........................... 324/174, 207.25, 324/207.15, 207.16, 173, 219; 384/448

(56) References Cited

U.S. PATENT DOCUMENTS 5,278,496 A * 1/1994 Dickmeyer et al. .... 324/207.15

* cited by examiner

*Primary Examiner*—Walter E. Snow
(74) *Attorney, Agent, or Firm*—Bachman & LaPointe, P.C.

(57) ABSTRACT

A mounting for a wheel-revolution sensor in the wheel support of a motor vehicle for scanning a revolving pole ring on a wheel comprises an insert which passes through a bore in the wheel support which receives the sensor in an ideal position with respect to the pole ring.

7 Claims, 2 Drawing Sheets

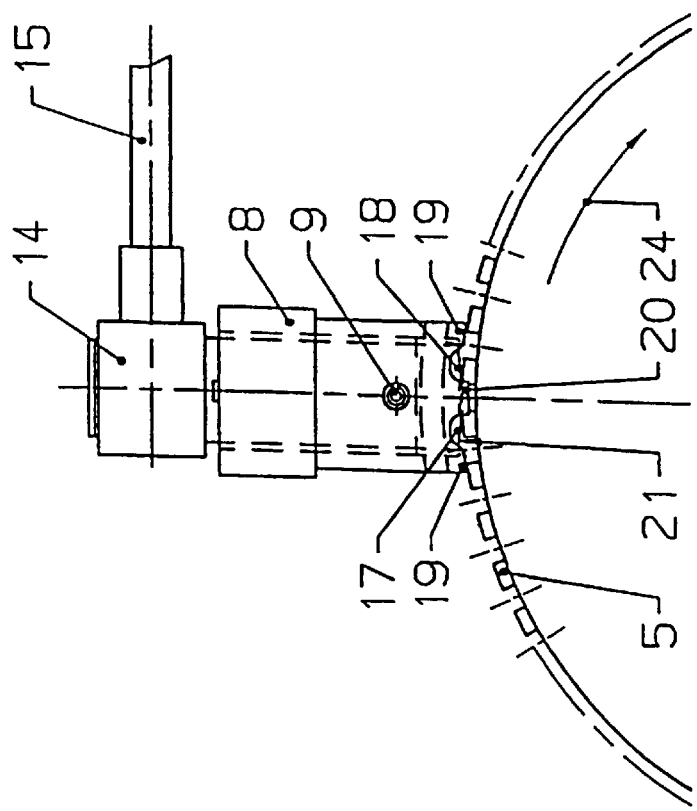
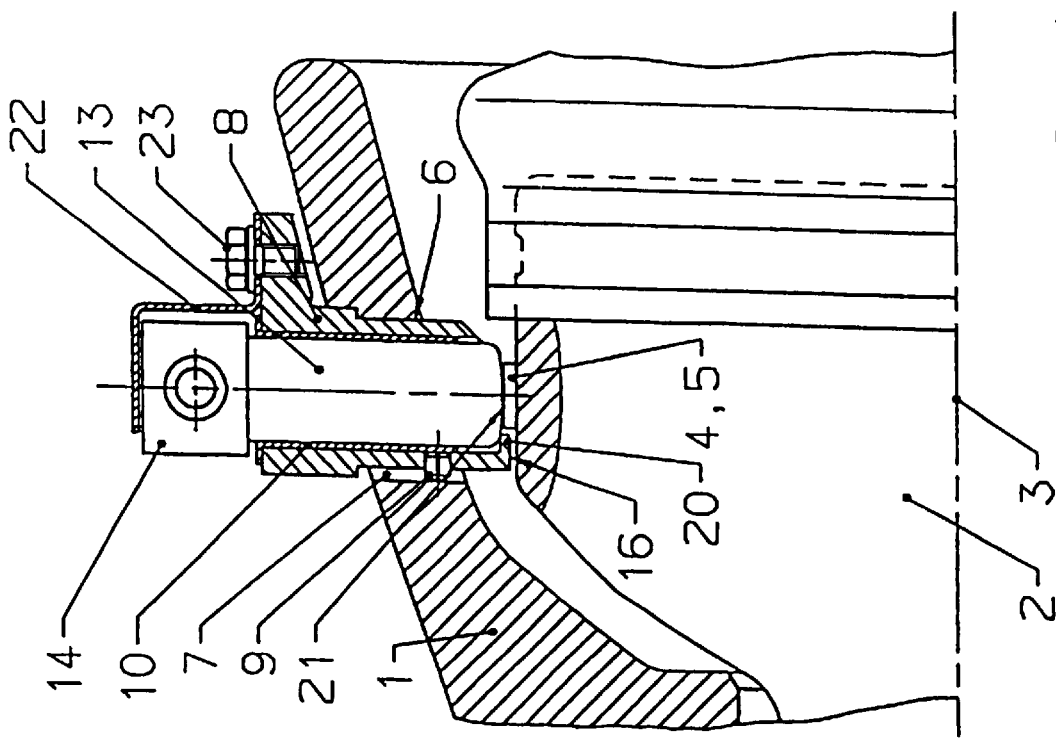

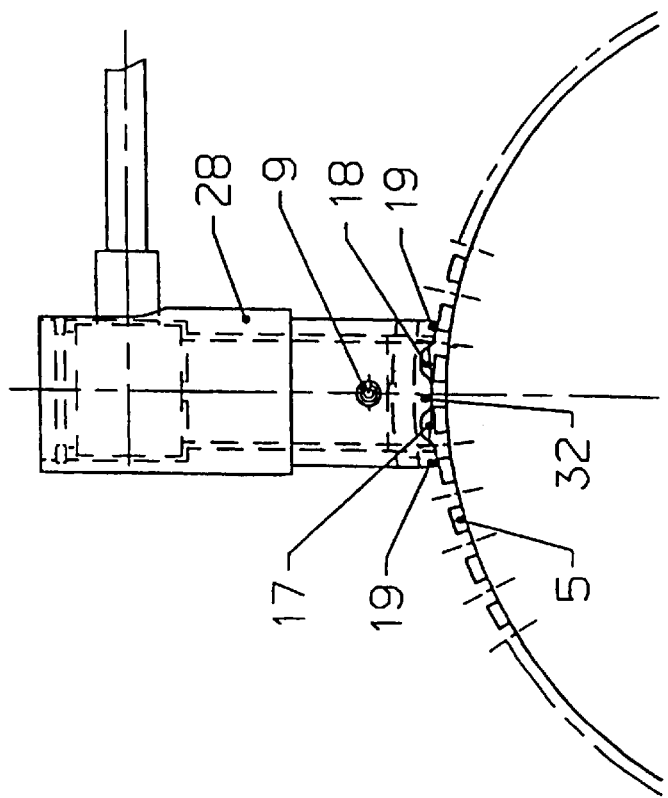
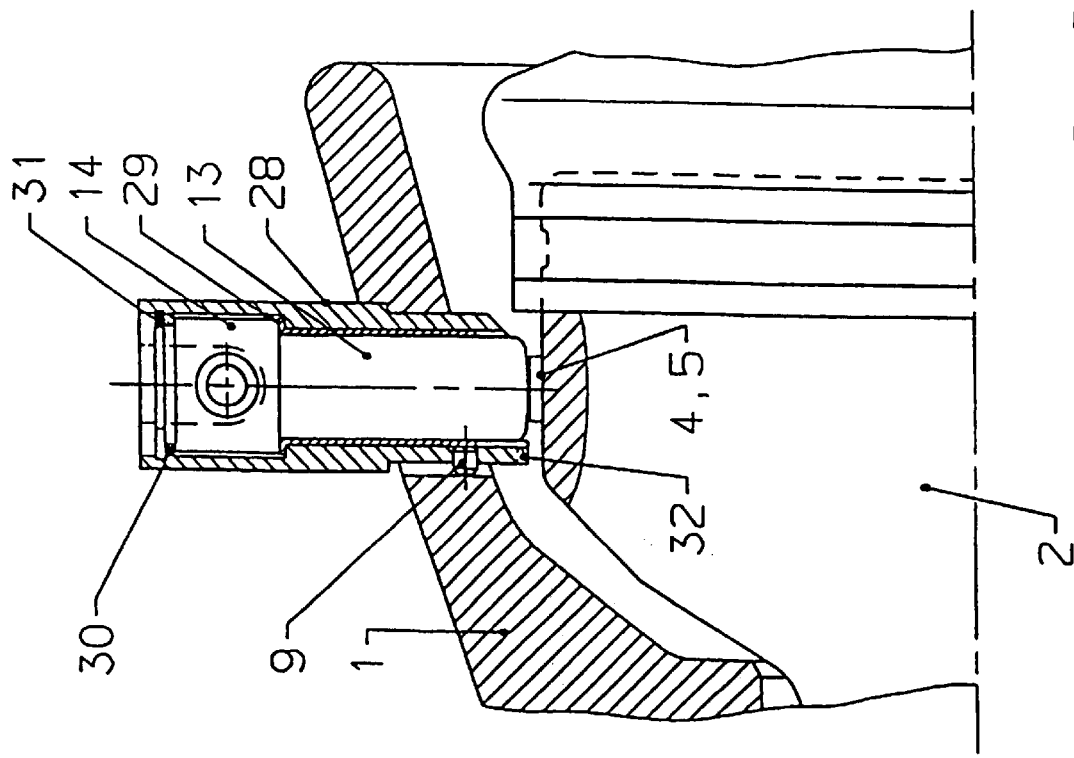

MOUNTING FOR A WHEEL-SPEED SENSOR

BACKGROUND OF THE INVENTION

The innovation relates to a mounting means for a wheel-revolution sensor in the wheel support of a motor vehicle, for scanning a revolving pole ring, said mounting means comprising an insert which passes through a bore in the wheel support and into which the sensor is designed to be pushed on that side which faces away from the pole ring.

Wheel-revolution sensors, in particular passive inductively operating sensors for motor vehicles, are usually placed in a protective insert, as indicated in DE 37 03 395 A. In this regard, a spring cage is usually used, and the sensor is pushed directly against the pole ring. As a result of the bearing play of the rotating parts which support the pole ring and as a result of the out-of-roundness of the pole ring, the sensor is then slightly pushed in an outward direction. This results in a gap of about 0.2 mm in the mounted state.

In view of the fact that, due to the construction, the bearing play increases in the course of the service life, the clamping force of the spring cage is to be dimensioned such that the sensor, when making contact with the pole ring, is pushed out slightly, but not damaged spacing at which still just usable pulses are generated is about 0.8 mm Yet, since the amplitudes are also low precisely when detecting the drive slip when starting-up (low frequencies), while accurate measuring is required, it is necessary for this spacing to be kept to a minimum.

Specifically with regard to all-terrain vehicles, incidents do occur in which mud particles and gravel are caught between the pole ring and the sensor, pushing the sensor out of its position. In so doing, the spacing between the sensor and the pole ring is increased beyond the operative range. Filling the tooth gaps of the pole ring with non-metallic material (e.g. EP 597 378 Al) also does not afford relief. In front of the sensor, a mud cake may build up and either push out the sensor or, if it hardens or freezes, damage the sensor.

SUMMARY OF THE INVENTION

The foregoing object is achieved wherein an insert is provided with a limit stop for the sensor in the fully inserted position, and in that, in this position, that edge of the insert which faces the pole ring projects beyond the sensor.

The limit stop determines the optimal position; the projecting edge protects the senior, such that it is no longer necessary to tolerate the expulsion of the sensor upon contact.

In a particularly advantageous further development of the innovation, that edge of the insert which faces the pole ring is provided with recesses in the sectors beyond the zone which is swept by the pole ring. These recesses, which are disposed laterally relative to the circumerential direction of the pole ring, ensure the lateral discharge of earth particles, which were squeezed through by the pole ring under the edge, it being possible for said particles to fall out laterally, thereby preventing an accumulation of material under the sensor, as a result of which it would otherwise by pushed outwardly.

In a further development, two recesses are provided in the sector, in the circumferential direction of the pole ring in each case one upstream and downsteam of the point of the greatest breadth of the sector. As a result hereof, the sensor remains protected against interference from the side, while it is possible for the two respective recesses to be shaped and arranged in an optimal manner in respect of the two directions of rotation.

In one optional embodiment, the limit stop is designed to be a shoulder in the interior of the insert, while in another optional embodiment it is designed to be an inwardly directed projection of the edge of the point of greatest breadth of the sector. Accordingly, the limit stop is arranged laterally of the zone swept by the pole ring, thereby also complementing the self-cleaning effect of the insert.

In a further development, two recesses are provided in the sector, in the circumferential direction of the pole ring in each case one upstream and one downstream of the point of the greatest breadth of the sector. As a result hereof, the sensor remains protected against interference from the side, while it is possible for the two respective recesses to be shaped and arranged in an optimal manner in respect of the two directions of rotation.

In further developing the embodiment comprising the limit stop which is designed to be a shoulder in the interior of the insert, the head of the sensor is positioned between a spring ring, supporting an O-ring, and the shoulder.

In an alternative embodiment, the sensor is held in its lowermost position by means of a bracket.

BRIEF DESCRIPTION OF THE DRAWINGS

The innovation will be described and explained hereinafter with reference to the drawings, in which:

FIG. 1 shows an axial section of a first exemplified embodiment of the innovation, FIG. 2 shows the respective peripheral section, FIG. 3 shows an axial section of a second exemplified embodiment of the innovation, FIG. 4 shows the respective peripheral section.

DETAILED DESCRIPTION

In FIG. 1, the wheel support of a motor vehicle is designated by reference number 1 and that part of a, for example, driven wheel revolving at wheel speed is designated by reference number 2. The wheel support 1 is the non-revolving part of an axle unit which supports the wheel. The revolving part 2 may be part of a brake drum or drake disc, a wheel hub, part of a driven axle or, as in the exemplified embodiment illustrated, part of a constantvelocity universal joint of a driven steering axle. The axis of rotation of said revolving part is designated by reference number 3. Attached to said revolving part 2 is a pole ring 4 comprising spaced teeth 5.

At a point which corresponds to the position of the pole ring, the wheel support 1 is provided with a bore 6 which, in the present instance, comprises an axial groove 7. The insert 8, which is designed to accommodate the sensor, fits into the bore 6, where it is secured against rotation by means of a locating pin. The insert 8 accommodates a sensor 13, from the head 14 of which emerges a signal line 15 (FIG. 2).

The bottom edge 16 of the insert 8, which bottom edge is circular in a plan view, has a remarkable contour. It is expedient to refer to those parts of the plan view which are not swept by the pole ring 4 as sectors. Recesses 17, 18 and, in the circumferential direction, upstream and downstream of said recesses, i.e. where the edge 16 is swept by the pole ring 4, projecting ends 19 are provided in at least one of the two sectors. Between the recesses 17, 18 at the point of the greatest breadth of the sector, the edge 16 is extended downwardly and directed inwardly, forming a limit stop 20 for the bottom 21 of the sensor 13. (See FIGS. 1 and 2).

The operating method is explained with reference to FIG. 2: while the revolving part 2 is rotating in direction 24, the projecting end 19 in a manner of speaking scrapes off dirt particles which are carried by the pole ring 4. Whatever remains, i.e. whatever is disposed between the teeth 5, is pushed out through the recesses 17, which are provided laterally when viewed in the direction of rotation, as a result of the friction effect of the pole ring 4 and the wedge effect of the bottom 21 of the sensor. When the direction of rotation is reversed, the second recess 18 and the projecting end 19, which precedes said recess, operate in the same manner. The limit stop 20 between the two recesses 17, 18 also protects the pole ring 4 and the sensor 13 from damage from the side.

The exemplified embodiment illustrated in FIGS. 3 and 4 differs from the preceding embodiment only in that the insert 28 on the inner side comprises a shoulder 29 for supporting the head 14 of the sensor 13. The head 14 is held down by a spring ring 31, preferably via a flexible O-ring 30. It can be seen in FIG. 4 that the tab 32 between the two recesses 17, 18 has been retained, although, in this instance, it is not used as a limit stop. It is possible for the insert 8 and 28, respectively, to be secured in the wheel support 1 in any appropriate manner. It is also not a prerequisite to provide the spring cage lo, since the sensor 13, because of the particular design of the edge 16, no longer needs to be pushed in an outward direction, despite the small spacing between the bottom 21 of the sensor and the pole ring 4, although it is possible for said spring cage to be retained as an axial guiding means, as a result of which the insert (8) may have coarser manufacturing tolerance.

What is claimed is:

1. In a motor vehicle having a wheel support and a rotating member, mounting means for a wheel-revolution sensor for scanning a revolving pole ring on the rotating member, the mounting means comprising an insert which passes through a bore in the wheel support, the sensor being located in the insert, the sensor has a bottom surface which faces proximate to the pole ring when the insert is operationally located in the bore, the improvement comprising the insert is provided with a limit stop for the bottom surface of the sensor, the limit stop includes an edge which faces the pole ring and projects beyond the bottom surface of the sensor for scraping off particles carried by the pole ring.

2. Mounting means according to claim 1, wherein the edge of the insert which faces the pole ring has sectors which extend beyond a zone which is swept by the pole ring, and the sectors are provided with recesses.

3. Mounting means according to claim 2, wherein two recesses are provided in each of the sectors.

4. Mounting means according to claim 1, wherein the limit stop comprises a shoulder in the interior of the insert.

5. Mounting means according to claim 2, wherein the limit stop comprises an inwardly directed projection of the edge.

6. Mounting means according to claim 4, wherein the sensor has a head positioned in the insert between a spring ring, supporting an O-ring, and the shoulder.

7. Mounting means according to claim 1, wherein the sensor is held in position by a bracket.

* * * * *